US007957353B2

(12) United States Patent
Sashihara

(10) Patent No.: US 7,957,353 B2
(45) Date of Patent: Jun. 7, 2011

(54) SYSTEM AND METHOD FOR INFORMING THAT USER IS IN OR NOT IN WIRELESS LAN SERVICE

(75) Inventor: Toshiyuki Sashihara, Tokyo (JP)

(73) Assignee: NEC Corporation, Tokyo (JP)

( * ) Notice: Subject to any disclaimer, the term of this patent is extended or adjusted under 35 U.S.C. 154(b) by 1140 days.

(21) Appl. No.: 10/644,857

(22) Filed: Aug. 21, 2003

(65) Prior Publication Data

US 2004/0043766 A1   Mar. 4, 2004

(30) Foreign Application Priority Data

Aug. 27, 2002   (JP) ................................. 2002-246893

(51) Int. Cl.
*H04W 4/00* (2009.01)
(52) U.S. Cl. ....................................... 370/338; 709/224
(58) Field of Classification Search .................. 370/332, 370/350, 432, 322, 236, 252, 389, 392, 395.2; 455/432.1, 435.1
See application file for complete search history.

(56) References Cited

U.S. PATENT DOCUMENTS

| 5,537,395 | A | 7/1996 | Alles et al. | |
|---|---|---|---|---|
| 6,201,962 | B1 | 3/2001 | Sturniolo et al. | |
| 6,308,071 | B1 | 10/2001 | Kalev | |
| 6,505,114 | B2 * | 1/2003 | Luciani | 701/117 |
| 6,842,460 | B1 * | 1/2005 | Olkkonen et al. | 370/465 |
| 2002/0058530 | A1 * | 5/2002 | Akama | 455/556 |
| 2002/0061745 | A1 * | 5/2002 | Ahn et al. | 455/432 |
| 2002/0086642 | A1 | 7/2002 | Ou et al. | |
| 2003/0065805 | A1 * | 4/2003 | Barnes, Jr. | 709/231 |
| 2003/0081567 | A1 * | 5/2003 | Okanoue et al. | 370/328 |
| 2003/0152075 | A1 * | 8/2003 | Hawthorne et al. | 370/389 |
| 2003/0156542 | A1 * | 8/2003 | Connor | 370/236 |
| 2003/0212567 | A1 * | 11/2003 | Shintani et al. | 705/1 |
| 2003/0220835 | A1 * | 11/2003 | Barnes, Jr. | 705/14 |
| 2003/0224763 | A1 * | 12/2003 | Kuramatsu | 455/412.2 |

(Continued)

FOREIGN PATENT DOCUMENTS

EP   1 161 031 A2   12/2001

(Continued)

OTHER PUBLICATIONS

Jim Geier, "Overview of the IEEE 802.11 Standard", Dec. 6, 2001.*

(Continued)

*Primary Examiner* — Jianye Wu
(74) *Attorney, Agent, or Firm* — Foley & Lardner LLP

(57) ABSTRACT

A preset data storing means 108 stores identification data of the user's own subscribed hot spot data and identification data of a hot spot dealer in roaming contract relation to the own hot spot dealer. A wireless communication means 107 obtains the electric field intensity of a channel as a subject of survey and identification data of a dealer. A means functions, when the obtained identification data is identical with the identification data user's own subscribed hot spot dealer as stored in the preset data storing means, to display on a display means 105 that the obtained identification data is the identification data of the user's own subscribed hot spot dealer such that the user can understand the displayed content at a glance, and when the obtained data fails to be identical with the roaming contract relation hot spot dealer, to display on the display means 105 that the obtained electric field intensity is that of the roaming contract relation dealer such that the user can understand the displayed content at a glance.

14 Claims, 3 Drawing Sheets

U.S. PATENT DOCUMENTS

2004/0043766 A1* 3/2004 Sashihara .................. 455/432.1
2004/0223452 A1* 11/2004 Santos et al. .................. 370/229

FOREIGN PATENT DOCUMENTS

| | | |
|---|---|---|
| EP | 1 168 775 A2 | 1/2002 |
| EP | 1 229 751 A1 | 8/2002 |
| JP | 05-252111 | 9/1993 |
| JP | 08-018479 | 1/1996 |
| JP | 10-145833 | 5/1998 |
| JP | 11-004482 | 1/1999 |
| JP | 2001-508245 | 6/2001 |
| JP | 2001-508245 A | 6/2001 |
| JP | 2002-064868 A | 2/2002 |
| WO | WO 98/42152 | 9/1998 |
| WO | WO 01/86973 A2 | 11/2001 |
| WO | WO 01/97491 A1 | 12/2001 |

OTHER PUBLICATIONS

J. Ala-Laurila et al., "Wireless LAN Access Network Architecture for Mobile Operators," IEEE Communications Magazine, IEEE Service Center, vol. 39:Nov. 11, 2001, pp. 82-89.

* cited by examiner

SYSTEM AND METHOD FOR INFORMING THAT USER IS IN OR NOT IN WIRELESS LAN SERVICE

BACKGROUND OF THE INVENTION

This application claims benefit of Japanese Patent Application No. 2002-246893 filed on Aug. 27, 2002, the contents of which are incorporated by the reference.

The present invention relates to techniques of notification in (public) wireless LAN service area and, more particularly, to a device or system for and a method of providing, when providing a display as to whether the user is in the service area of a hot spot service, a clear display as to whether the pertinent service area belongs to a hot spot dealer, which the user has subscribed to, or to a dealer in roaming contract relation to the hot spot dealer.

At present, hot spot services using wireless LAN of IEEE 802.11b system is attracting pronounced attentions.

As the hot spot service, communication dealers, managers of a shop or a restaurant, etc. install wireless LAN access points in airport lobbies, shops, restaurants and also many places where many people come to, provide high speed wireless data communication services. The users can make use of the service for WWW (world wide web) browser or transmission and reception of electronic mails by using personal computers with wireless LAN (local area network) cards mounted thereon or PDA (personal digital assistants).

The user can receive the service by making a contract with the pertinent hot spot service dealer. While the hot spot service is raised in various places by various dealers, the area which is covered by a wireless LAN access point is as large as a hundred and several ten meters outdoors and several ten meters indoors. 2.4 GHz having a strong directivity is used. In IEEE 802.11b, a new modification system is added to a conventional transmission system using a 2.4 GHz band to permit communication utmost at 11 Mbps. An enormous property burden on a dealer to cover main regions over the country of Japan. It is thus thought that a hot spot dealer intends to expand its covered area by concluding a roaming contract with a different dealer. In this case, it is thought that the user intending to obtain service in the area of a dealer in roaming contrast relation to the hot spot dealer subscribed by the user, has to pay an extra communication fee.

In the mean time, the user can have a rough intelligence about whether the user is now in the service area, with a map of the service area notified by the hot spot dealer and software in a wireless LAN product to show electric field intensity relevant thereto. The software provides the electric field intensity of a wireless LAN channel, via which ESS (Extended Service Set) ID designated by the user is transmitted. As a measure concerning the security between access point (AP) and station (STA), an authentication procedure is executed between AP and STA through open system authentication in which ID is exchanged in two steps between AP and STA, and/or a common key authentication is executed in which ID is ciphered and exchanged in four steps. As for the actual product, group setting is made in the name of "ESS ID" or the like.

When the ESS ID is designated by the hot spot dealer, rough intelligence about whether the user is in the service area of the dealer can be obtained by setting the software providing the electric field intensity.

In the above background, the following problem is raised in connection with hot spot service reception by the user.

Where ESS ID is given for identifying the hot spot dealer, using the above indicator the user can not check whether the user is in the service area of a hot spot dealer in roaming contract relation to the own subscribed hot spot dealer, but can check only whether the user is in the service area of the own hot spot dealer.

Also, where the hot spot dealer in the roaming contract relation uses the same ESS ID, the user cannot distinguish whether the user is in the area of the own subscribed dealer or in the area of the roaming contract relation dealer.

In the viewpoint of the user side, it is more convenient that display is made not only as to whether the user is in the service area of the own subscribed hot spot dealer but also as to whether the user is in the service area of the roaming contract relation dealer in roaming contract relation is made.

Also, from the consideration that receiving service in the area of the dealer in roaming contract relation requires payment of an extra fee, it is more convenient to provide a display, which permits clear distinguish as to whether the user is in the area of the own subscribed dealer or in the area of the roaming contract relation dealer instead of providing display of the two cases in the same fashion.

As further prior art examples, Japanese Patent Laid-Open No. 10-145833 discloses a system, which provides for a mobile terminal a step of detecting a roaming call at the time of call transmission and reception, a step of checking, with reference to a roaming control table, as to whether a wireless base station of the dealer, which is subscribed to by the mobile terminal, is in the overlap area, and a step of making a hand-over request when the pertinent wireless base station is found, thus permitting communication via the dealer's wireless base station as much as possible even in the case that roaming call is allowed. Japanese Patent Laid-Open No. 11-004482 discloses a mobile telephone set, which provides for a call transmission process comprising a step of retrieving for a base station, which permits call transmission in the status of the base station of each service company, a step of measuring the electric intensity of the base station permitting the call transmission and a step of selecting the best base station, and has a function of transmitting a call with ID of a good wave status service company without any designation by the user but automatically. A further hot spot identification teaching, Japanese Patent Laid-Open No. 2001-508245 is referred to.

SUMMARY OF THE INVENTION

An object of the present invention is to provide a method of and a system for providing a display as to whether the user is in the service area of a hot spot service.

To attain the above object of the present invention, in an informing system in a wireless LAN service area, mere display of the electric field intensity of a carrier of wireless LAN shows not only whether the user is in the service area but also whether the displayed electric field intensity is that of the user's own subscribed hot spot dealer or that of the dealer in roaming contract relation to the own hot spot dealer.

More specifically, according to an aspect of the present invention, there is provided a system for informing that the user is in or not in wireless LAN service area comprising at least: a preset data storing means for storing identification data of a hot spot dealer, to which the user is subscribed, and identification data of a hot spot dealer in roaming contract relation to the user's own subscribed hot spot dealer; a wireless communication means; a display means; and a means functioning: when providing a display as to whether the user is in the service area of a hot spot service, to obtain the electric field intensity of a channel as a subject of survey and identification data of a dealer and check whether the obtained identification data is identical with identification data of the user's own subscribed hot spot dealer, which is stored in the preset data storing means; when the obtained identification data is identical with the identification data of the user's own subscribed hot spot dealer, to output data for display on the display means such that the user can decide that the obtained electric field intensity is that of the user's own subscribed hot spot dealer; and when the obtained identification data is identical with the identification data of the roaming contract relation dealer, to output data for display on the display means such that the user can decide that the obtained electric field intensity is that of the roaming contract relation dealer.

The display means includes a light-emitting means; and a control means for causing the light-emitting means to emit informing light in different colors in the case when the user is in the service area of the user's own subscribed hot spot dealer and the case when the user is in the service area of the dealer in roaming contract relation to the own hot spot dealer.

According to another aspect of the present invention, there is provided a system for informing that the user is in or not in a wireless LAN service area, comprising a means for collecting data link layer level protocol data, obtaining congestion degree in service area and outputting the obtained congestion degree to display means.

The system further comprises a means for collecting data link layer level protocol data, obtaining the congestion degree in the service area and outputting the obtained congestion degree to the display means.

The display means includes a light-emitting means; and a means functioning to control the display of the congestion degree by controlling the flickering period of the light-emitting means based on the congestion degree.

The display means includes a light-emitting means; and a means functioning to have the light-emitting means to emit light in different colors in the case of displaying that the user is in the service areas of the user's own contracted hot spot dealer and in the case of displaying that the user is in the service area of a hot spot dealer in roaming contract relation to the own hot spot dealer; and to display the congestion degree by controlling the flickering cycle of the light-emitting means according to the congestion degree.

Wireless LAN ESS (extended service set) ID is used as identification data of the hot spot dealer.

The system further comprises an agent authentication means set by the user's own subscribed hot spot dealer and a hot spot dealer in roaming contract relation to the own hot spot dealer; and in which: at the user side terminal data concerning the authentication means of the user's own subscribed hot spot dealer and a hot spot dealer in roaming contract relation to the own hot spot dealer and data necessary for these authentications are preliminarily stored in the memory means; the agent authentication means carries out authentication by using the data preset by the user; and when the agent authentication means has carried out authentication successfully, data indicative of that the pertinent service area is that of the successfully authenticated hot spot dealer is outputted to the display means for display.

The system further comprises a means for deciding, when a check is made as to whether the obtained identification data is identical with the identification data of the user's own subscribed hot spot dealer as stored in the preset data storing means, that the obtained identification data and the identification data stored in the preset data storing means are identical when the two data are not perfectly identical but partly identical.

According to other aspect of the present invention, there is provided a station system connected for communication with a wireless LAN access point, which comprises the system for informing that the user is in or not in a wireless LAN service area according to the above.

According to still other aspect of the present invention, there is provided a method of informing that the user is in or not in a wireless LAN service area, in which: identification data of the user's own subscribed hot spot dealer and identification data of a hot spot dealer in roaming contract relation to the own hot spot dealer are stored in a preset data storing means; and which comprises: a step executed by a wireless communication means to obtain the electric field intensity of a channel as a subject of survey and identification data of a dealer and check whether the obtained identification data is the identification data of the user's own subscribed hot spot dealer as stored in preset data storing means; a step of displaying, when the obtained identification data is identical with the user's own subscribed hot spot dealer, that the obtained electric field intensity is that of the user's own subscribed hot spot dealer on a display means such that the user can understand the displayed content at a glance; a step of making a check, when the obtained identification data fails to be identical with the identification data of the user's own subscribed hot spot dealer, as to whether the obtained data is identical with the identification data of the roaming contract relation dealer; and a step of displaying, when the obtained identification data is identical with the identification data of the roaming contract relation dealer, that the obtained electric field intensity is that of the roaming contract relation dealer such that the user can understand the displayed content at a glance.

The light-emitting means in the display means is controlled to emit informing light in different colors in the case of displaying that the user is in the service area of the user's own subscribed hot spot dealer and in the case of displaying that the user is in the service area of a hot spot dealer in roaming contract relation to the own hot spot dealer.

According to further aspect of the present invention, there is provided a system for informing that the user is in or not in a wireless LAN service area, which comprises a step of collecting data link layer protocol data, obtaining the congestion degree of the service area and outputting the obtained congestion degree to the display means.

The system comprises a step of collecting data link layer level protocol data, obtaining the congestion degree of the service area and outputting the obtained congestion degree to the display means.

The system comprises a step of displaying the congestion degree by controlling the flickering cycle of the light-emitting means in the display means according to the congestion degree.

The system comprises a step of collecting data link layer level protocol data, obtaining the congestion degree of the service area and displaying the congestion degree by controlling the flickering cycle of the light-emitting means based on the congestion degree.

Wireless LAN ESS (Extended Service Set) ID is used as the identification data of the hot spot dealer.

According to still further aspect of the present invention, there is provided a method of informing that the user is in or not in a wireless LAN service area, in which: data concerning authentication means of the user's own subscribed hot spot dealer and a hot spot dealer in roaming contract relation to the own hot spot dealer and data necessary for these authentications are preliminarily stored in a storing means; and which comprises: a step executed by the agent authentication means for authentication by using data preset by the user; and displaying, when the agent authentication means has carried out successful authentication, that the service area is of the successfully authenticated hot spot dealer.

The wireless LAN service is a public wireless LAN service.

Other objects and features will be clarified from the following description with reference to attached drawings.

PREFERRED EMBODIMENTS OF THE INVENTION

Figure 1:
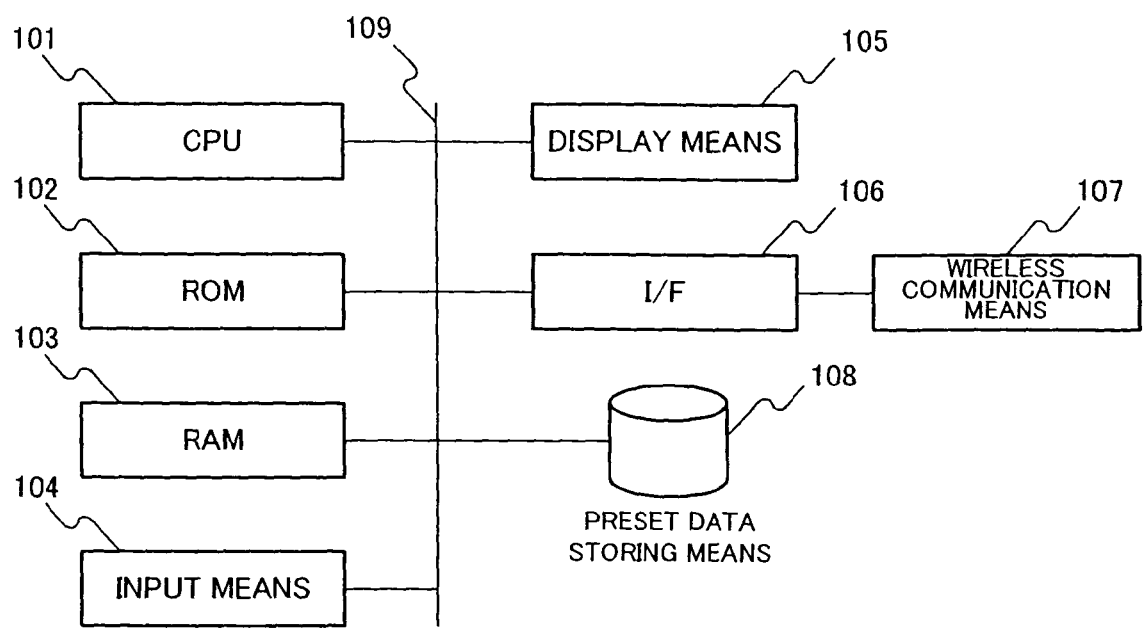
FIG. 1 is a block diagram of a system for informing that the user is in or not in wireless LAN service area according to an embodiment of the present invention.

Preferred embodiments of the present invention will now be described with reference to the drawings.

According to the present invention, a preset data storing means 108 is provided, which stores identification data of the user's own subscribed hot spot dealer and also identification data of dealers in roaming contract relation to the own hot spot dealer, and a means is also provided, in which the electric field intensity of a channel as a subject of survey and dealer's identification data are obtained from a wireless communication means 107, a check is made as to whether the obtained identification data is identical with identification data of the user's own subscribed hot spot dealer, as stored in the preset data storing means 108, and when the obtained identification data is identical with the identification data of the user's own subscribed hot spot dealer, display data showing that the obtained electric field intensity is that of the user's own subscribed hot spot dealer is displayed on a display means 105 such as to be understood at a glance by the user, while when the obtained identification data is not identical with the user's own subscribed hot spot dealer but is identical with the identification data of the roaming contract relation dealer, display data showing that the obtained electric field intensity is the electric field intensity of the roaming contract relation dealer on the display means 106 such as to be understood at a glance by the user. In one embodiment of the present invention having the above arrangement, display as to whether the user is in the service area of the hot spot service, is made such that it is clearly understood by the user that the service area is that of the user's own subscribed hot spot dealer or that of a hot spot dealer in roaming contract relation to the own hot spot dealer.

On one embodiment of the present invention, the display means 105 has a plurality of LEDs (light-emitting diodes) or the like, and is controlled such that it informs the case of the service area of the own hot spot dealer and the case of the service area of a hot spot dealer in roaming contract relation to the own hot spot dealer by emitting light in different colors.

As a different embodiment of the present invention, it is possible to arrange such as to collect data link layer level protocol data, obtain the degree of congestion in the service area and output the obtained congestion degree data to the display means. In this embodiment, the congestion degree is displayed by changing the cycle of flickering of the light-emitting means according to the congestion degree.

As a further alternative, the display means may be controlled such that its light emitting means emits light in different colors in the case of the service area of the own hot spot dealer and the case of the service area of the roaming contract relation dealer, and also that for the congestion degree display the light emitting means provides variable flickering frequency according to the congestion degree.

Furthermore, in the embodiment of the present invention, wireless LAN ESS ID is used as identification data of the hot spot dealer.

Yet further, as a different embodiment of the present invention it may be arranged that authentication means concerning the user's own contracted hot spot dealer and a hot spot dealer in roaming contract relation to the own hot spot dealer and also data necessary for the authentication are preset in a storing means, the authentication means does authentication by using data preset by the user, and in case when authentication is successful, a display showing that the service area is that of a hot spot dealer which is successful in authentication is made on the display means.

The above embodiment will now be described in greater details. The embodiment will be described with reference to the drawings. FIG. 1 is a view showing the arrangement of the embodiment of the present invention. Referring to the Figure, the embodiment of the system comprises a CPU (central processing unit) 101, a ROM (read-only memory) 102, a RAM (random access memory 103, an input means 104, a display means 105, an I/F (interface) 106, a wireless communicating means 107, a preset data storing means 108 and a bus 109.

The CPU 101 executes software stored in the ROM 102 and RAM 103. In the ROM 102, software executed in the CPU 101 is stored. The RAM 103 is a memory capable of reading and writing data, and it stores software executed in the CPU 101 and also data or the like to be transiently stored in the execution of the software. The input means 104 is constituted by a keyboard or the like and used for the input of preset data by the user. The display means 105 has a display or a LED (light-emitting diode) for showing electric field data to the user. The I/F 106 is an interface provided between the wireless communication means 107 such as PCMCIA and the bus 109.

The wireless communication means 107 is provided for communication with wireless LAN access points (APs) such as wireless LAN cards, and it includes an antenna, an RF transmitting/receiving unit, a baseband/modem LSI, a DSP (digital signal processor) CPU, etc. The preset data storing means 108 is a hard disc device or like storing device, and stores ESS ID or the like issued as hot spot dealer preset by the user. Data exchanged among the means 101 to 108 are transferred via the bus 109.

Figure 2:
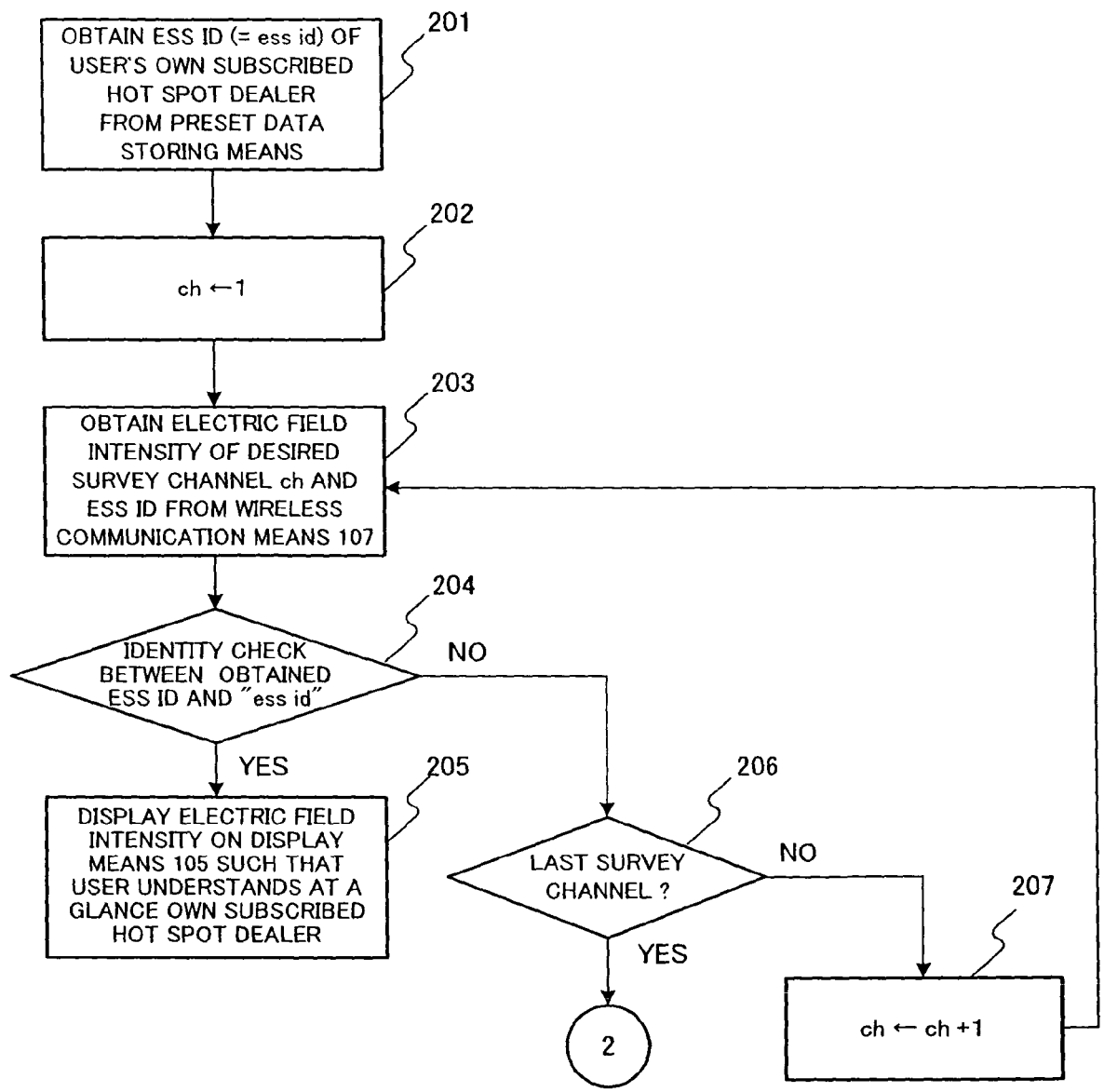
FIGS. 2 and 3 are flow charts representing the operation of the embodiment shown in FIG. 1.
Figure 3:
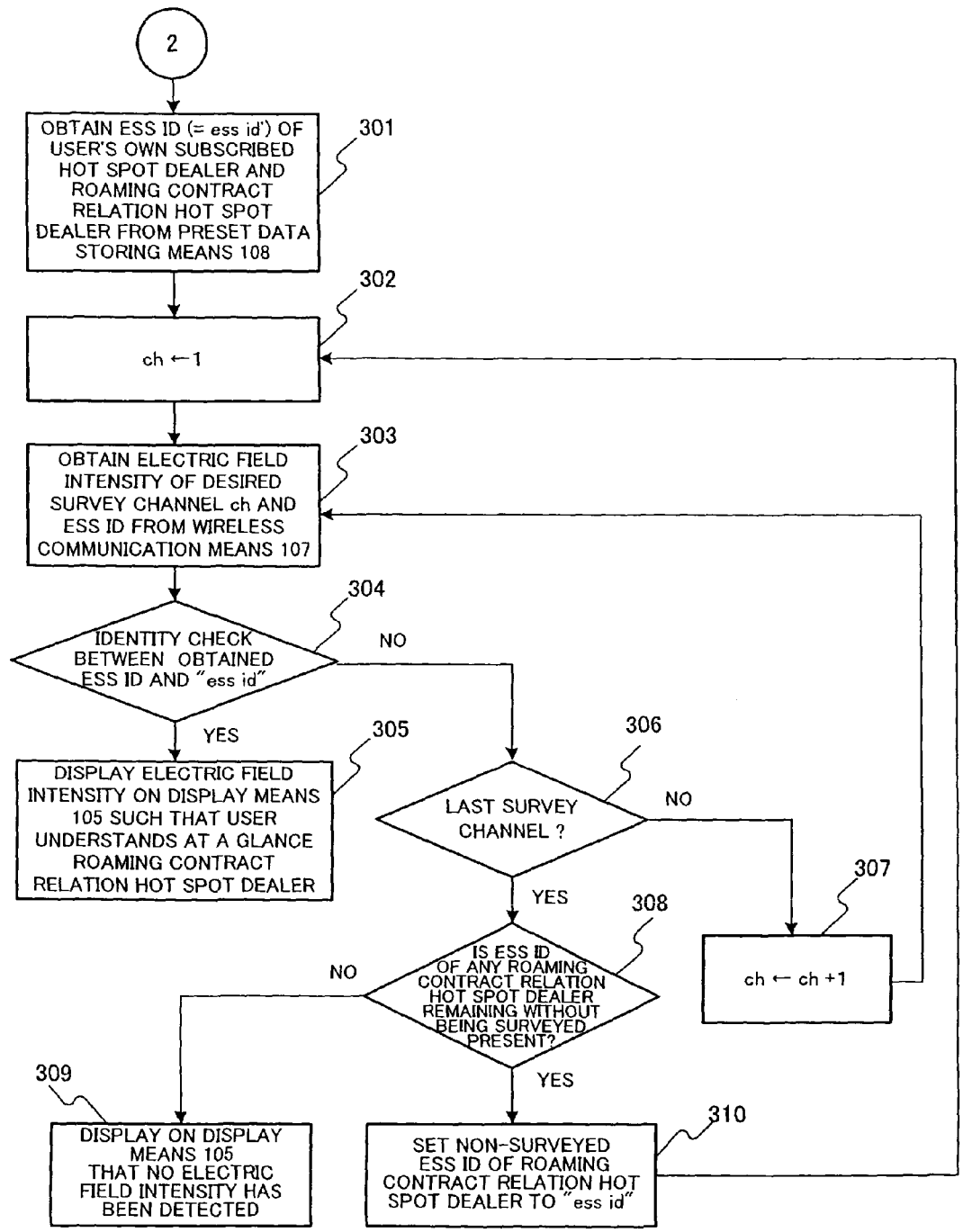

FIGS. 2 and 3 are flow charts for describing the operation routine in this embodiment.

Regarding to the identification of each hot spot dealer, it is made possible to identify APs installed by the dealer by using ESS ID stored in a transmission beacon. The user preliminarily inputs ESS ID of the hot spot dealers in the roaming contract relation to the preset data storing means 108 by using the input means 104. It is assumed that a timing of displaying the electric field intensity on the display means 105 is reached. The timing depends on the actual fitting of component means.

First, the CPU 101 which executes programs stored in the ROM 102 and the RAM 103, and obtains ESS ID (="ess id") of the user's own subscribed hot spot dealer (step 201). Then, the CPU 01 initializes the survey channel value "ch". In this embodiment, it is assumed that the "ch" value is "1" with the first channel and "14" with the last channel. The CPU 101 first substitutes "1" for "ch" (step 202). Then, the CPU 101 obtains the electric field intensity of survey channel ch and the ESS ID from the wireless communication means 107 (step 203).

Then, the CPU 101 checks whether the obtained ESS ID is identical with "ess id" (step 204).

If the ESS ID is identical, the CPU 101 causes display of the electric field intensity obtained at the same time on the display 105 (step 205). At this time, the display is made such that the user understands at a glance that the obtained electric field intensity is that of the user's own subscribed hot spot dealer.

If it is not decided in the step 204 that the ESS ID is not identical, the CPU 101 checks whether the present channel under the survey is the last one of the survey channels (step 206). If the present survey channel is not the last one, the CPU 101 adds "1" to the present channel value "ch", and then goes back to the step 203 to again obtain the electric field intensity of the desired survey channel ch and the ESS ID from the wireless communication means 107. If it is found in the step 206 that the present survey channel is the last channel, the CPU 101 goes to the routine shown in FIG. 3.

Referring to FIG. 3, the CPU 101 first obtains the ESS IDs (="ess ids") of the user's own subtracted hot spot dealer and the roaming contract relation hot spot dealer (step 301).

Then, the CPU 101 initializes the survey channel value "ch" (step 302). Then, the CPU 101 obtains the electric field intensity of the survey channel ch and the ESS ID from the wireless communication means 107 (step 303). Then the CPU 101 checks whether the obtained ESS ID is identical with "ess id" (step 304).

If the obtained ESS ID is identical, the CPU 101 causes display of the electric field intensity obtained at the same time on the display means 105 (step 305). At this time, the display is made such that the user understands at a glance that the obtained electric field intensity is that of the hot spot dealer in roaming contract with the user's own subscribed hot spot dealer.

If it is not decided in the step 304 that the obtained electric field intensity is identical with "ess id", the CPU 101 checks whether the present channel under survey is the last survey channel (step 306).

If the present channel is not the last channel, the CPU 101 adds "1" to the survey channel value "ch", and goes back to the step 303 to again obtain the electric field intensity of the desired survey channel ch and the ESS ID from the wireless communication means 107.

If the present channel is the last channel, the CPU 101 checks whether ESS ID of any roaming contract relation hot spot dealer remaining without being surveyed is present (step 308).

If the ESS ID of a roaming contract hot spot dealer remaining without being surveyed is found, the CPU 101 sets the non-surveyed ESS ID to "ess id", and goes back to the step 302 to start the routine afresh.

If no ESS ID remaining without being surveyed is found in the step 308, the CPU 101 causes display on the display means 105 that no electric field intensity has been detected (step 309).

While ESS ID is used as a method of hot spot dealer identification, this method is by no means limitative.

The display means 105 may be the display of a personal computer or a PDA constituting a wireless LAN station, or a LED mounted on a wireless LAN card. In the case of the LED, such a light emission method is possible as to emit green light in the case of detecting the electric field intensity of the user's own subscribed hot spot dealer and emit orange light in the case of detecting the roaming contract relation dealer.

As for the fitting concern, fitting as software on a personal computer and also fitting as firm ware to be executed on a wireless LAN card may be made.

A different embodiment of the present invention will now be described. In the preceding first embodiment, display on the display means 105 is made as to whether the user is in the area covered by the user's own subtracted hot spot dealer or by the dealer in roaming contract relation to the own dealer.

In the second embodiment of the present invention, congestion degree (i.e., predicted thorough value) is displayed. The basic arrangement of the second embodiment of the present invention is the same as that of the first embodiment shown in FIG. 1, and is therefore not described.

The congestion degree is obtainable by collecting data link layer level protocol data. Specifically, in IEEE 802.11 protocol, for instance, data transmission is started after confirming with carrier sense function that no other terminal is transmitting any data (CSMA/CA, i.e., Carrier Sense Multiple Access with Collision Avoidance). The congestion degree is measured by Utilizing this carrier sense function and periodically making the carrier sense.

As an alternative, the congestion degree is measured by measuring the reliability of reception of ACK frame, which is transmitted from the access point (AP) when the terminal transmits data.

As a further alternative, the congestion degree is transmitted by measuring the frequency of reception of CTS (Clear To Send) frame, which is transmitted from the AP as a response to RTS (request to send) frame transmitted when a different terminal requests to transmit data.

In the second embodiment of the present invention, with the congestion degree displayed on the display means 105 the user can have intelligence of the throughput of communication on the site without actually starting the communication. Because the user can obtain the intelligence of the throughput, he or she can make such a selection as moving to a non-congested area without starting communication.

As a method of display on the display means 105, it is possible to cause display on the display of a personal computer or a PDA or by using an LED on a personal computer, a PDA or a wireless LAN card. In the case of causing display on the LED, such a method may be adopted as to have the LED "on" at all times in the non-congestion case and emit flickering light in the congestion case. Another method which may be adopted, is to vary the flickering cycle according to the congestion degree.

When displaying the congestion degree on the display means 105, it may be displayed together whether the user is in the covered area as described before in connection with the first embodiment.

For this display method, two LEDs, for instance, are prepared to:

(a) have a green LED "on" at all times when the user is in non-congested area, which is covered by the user's own subscribed dealer;

(b) have the green LED emit flickering light when the user is in congested area, which is covered by the user's own subscribed dealer;

(c) have an orange LED "on" at all times when the user is non-congested area, which is covered by the roaming contract relation dealer; and (d) have the orange LED emit flickering light when the user is in congested area, which is covered by the roaming contract relation dealer.

In the first embodiment, the ESS ID of the user's own subscribed dealer and the ESS ID of the dealer in roaming contract relation to the own dealer are inputted by the user himself or herself by using the input means 104, and are stored in the preset data storing means 108.

In a third embodiment of the present invention, the ESS ID data are not inputted by the user himself or herself, but are inputted via floppy (registered trademark) disc, communication cable such as RS-232C or an internet.

In the first embodiment, it is checked in the step 204 in FIG. 2 and the step 304 in FIG. 3 whether the obtained ESS ID is perfectly identical with the ESS ID of the user's own subscribed dealer or the ESS ID of the dealer in roaming contract relation to the own dealer.

In a fourth embodiment of the present invention, it is assumed that first n letters of ESS ID are allotted to each dealer in order that each dealer can secure a certain degree of freedom concerning the ESS ID allotment.

In this case, comparison of the first in letters, for instance, may be made for the identity check in lieu of the step 204 in FIG. 2 and the step 304 in FIG. 3, in which perfect ESS ID identity check is made. For the remainder of the arrangement, this embodiment is the same as the first embodiment.

A fifth embodiment of the present invention is applicable to a system arrangement, which is incapable of using any ESS ID as a dealer identification method but is capable of making a decision as to whether the user is in the covered area of the own subscribed dealer when and only when wireless LAN network access authentication is successful.

In this embodiment, an agent authentication means is provided in addition to the constitution element of the first embodiment.

In the operation of this fifth embodiment of the present invention, authentication check is made in lieu of comparing the obtained ESS ID and designated "ess id" in the step 204 in FIG. 2 and the step 304 in FIG. 3.

In this embodiment, the authentication means is preset independently by each dealer, and the user presets an authentication means informed from the user's own subscribed hot spot dealer and data necessary for the authentication.

For the check as to whether the user is in the covered area, the authentication means executes authentication by using data preset by the user and provides data as to whether the authentication has been successful.

In this case, if the authentication means in the roaming contrast relation dealer and data necessary for the authentication are entirely the same as those of the user's own subscribed dealer, the user cannot distinguish which covered area the user is in.

In the case of an authentication means, in which user ID, a password, etc. is inputted to a web display screen, different input images are provided with the two dealers (i.e., the user's own subscribed hot spot dealer and the roaming contract relation dealer). Thus, the distinction between the two dealers is made by surveying the display (i.e., HTML document).

As has been described in the foregoing, according to the present invention the following effect are obtainable.

According to the present invention, the user can discriminate at a glace whether he or she is in the area covered by the own subscribed hot sot dealer or in the area covered by the dealer in roaming contract relation to the own hot spot dealer.

Communication in the roaming contract dealer area leads to addition of an extra fee to the communication fee, and the user makes communication while bearing this fact in mind. The user thus can make various selections such as moving to nearby area covered by the user's own subscribed dealer if this is the case or reducing the communication time compared to the normal time by taking the communication fee into considerations.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A system for providing information of a hot spot dealer that provides service for a user in a wireless LAN service area, comprising:
   a preset data storing means for storing identification data of the hot spot dealer, which is a first service provider to which the user is subscribed to, or a second service provider in roaming contract relation to the first service provider, the identification data of each of the first and second service providers includes a unique identification code which is the same for all users;
   a wireless communication means for obtaining the electric field intensity and the identification code of the hot spot dealer,
   and for checking whether the obtained identification code is identical with the identification code of the first service provider or the second service provider; and
   a display means that includes:
      a light-emitting means; and
      a control means for causing the light-emitting means to emit informing light in a first color if the hot spot dealer is the first service provider and in a second color different from the first color if the hot spot dealer is the second service provider; and
      wherein a network congestion degree is displayed on the display means by a flickering cycle of the light-emitting means.

2. The system according to claim 1, which further comprises a means for collecting data link layer level protocol data, obtaining the network congestion degree in the service area and outputting the obtained network congestion degree to the display means.

3. The system according to claim 2, wherein the
   the network congestion degree is displayed by the control means controlling the flickering cycle of the light-emitting means according to the network congestion degree.

4. The system according to claim 1, wherein wireless LAN ESS (extended service set) ID is used as the identification code of the hot spot dealer.

5. The system according to claim 1,
   which further comprises an agent authentication means set by the first service provider and the second service provider; and
   in which:
   at the user side terminal, data concerning the agent authentication means of the first service provider and the second service provider and data necessary for these authentications are preliminarily stored in the preset data storing means;
   the agent authentication means carries out authentication by using data preset by the user; and
   when the agent authentication means has carried out authentication successfully, data indicative of that the pertinent service area is that of the successfully authenticated service provider is outputted to the display means for display.

6. The system according to claim 1, which further comprises a means for deciding, when a check is made as to whether the obtained identification code is identical with the identification code of the first service provider as stored in the preset data storing means, that the obtained identification data and the identification data stored in the preset data storing means are identical when the two data are not perfectly identical but partly identical.

7. A system according to claim 1, further comprising authentication means for performing an authentication of the first service provider or the second service provider, the authentication being performed using data preset by the user, whereby the authentication means outputs an indication on the display of the display means as to whether or not the authentication was successful.

8. A method of providing information of a hot spot dealer that provides service for a user in a wireless LAN service area, comprising:
- a step of storing, in a preset data storing means, identification data of the hot spot dealer, which is a first service provider to which the user is subscribed to, or a second service provider in roaming contract relation to the first service provider;
- a step executed by a wireless communication means to obtain the electric field intensity and a identification code of the hot spot dealer, and to check whether the obtained identification code is the identification code of the first service provider or the second service provider;
- a step of displaying, on a light-emitting means of a display means, a network congestion degree by controlling a flickering cycle of the light-emitting means according to the network congestion degree,
- wherein the identification data of each of the first and second service providers includes the unique identification code which is the same for all users,
- wherein the light-emitting means of the display means is controlled to emit light in a first color if the hot spot dealer is the first service provider and in a second color different from the first color if the hot spot dealer is the second service provider.

9. The method according to claim 8, which comprises a step of collecting data link layer level protocol data, and obtaining the network congestion degree of the service area based on the data link layer level protocol data.

10. The method according to claim 8, which comprises a step of collecting data link layer level protocol data, and obtaining the network congestion degree of the service area based on the data link layer level protocol data.

11. The method for according to claim 8, wherein wireless LAN ESS (Extended Service Set) ID is used as the identification code of the hot spot dealer.

12. The system according to claim 2, wherein the network congestion degree is obtained by measuring reliability of reception of an acknowledged (ACK) frame that is transmitted by an access point, or by measuring frequency of reception of a Clear to Send (CTS) frame that is transmitted by the access point, and wherein the network congestion degree is displayed on the display means having one of a plurality of colors for providing an indication of a level of congestion among a plurality of levels of congestion.

13. The method according to claim 8, wherein the network congestion degree is obtained by measuring reliability of reception of an acknowledged (ACK) frame that is transmitted by an access point, or by measuring frequency of reception of a Clear to Send (CTS) frame that is transmitted by the access point, and wherein the network congestion degree is displayed on the display having one of a plurality of colors for providing an indication of a level of congestion among a plurality of levels of congestion.

14. The system according to claim 2, wherein the system is a Carrier Sense Multiple Access System, and wherein the network congestion degree is obtained by periodically measuring a carrier sense function, and wherein the network congestion degree is displayed on the display means having one of a plurality of colors for providing an indication of a level of congestion among a plurality of levels of congestion.

* * * * *